United States Patent
Jung et al.

(10) Patent No.: US 9,062,907 B2
(45) Date of Patent: Jun. 23, 2015

(54) REFRIGERATOR WITH SEALING APPARATUS FOR DRAWER

(71) Applicant: LG Electronics Inc., Seoul (KR)

(72) Inventors: Moongyo Jung, Seoul (KR); Sanggyun Lee, Changwon-si (KR); Deulre Min, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/948,763

(22) Filed: Jul. 23, 2013

(65) Prior Publication Data

US 2014/0028171 A1    Jan. 30, 2014

(30) Foreign Application Priority Data

Jul. 24, 2012  (KR) .................. 10-2012-0080838

(51) Int. Cl.
| | | |
|---|---|---|
| A47B 96/04 | (2006.01) | |
| F25D 23/00 | (2006.01) | |
| A47J 47/10 | (2006.01) | |
| F25D 23/08 | (2006.01) | |
| F25D 25/02 | (2006.01) | |

(52) U.S. Cl.
CPC .............. *F25D 23/00* (2013.01); *A47J 47/10* (2013.01); *F25D 23/085* (2013.01); *F25D 25/025* (2013.01)

(58) Field of Classification Search
CPC .............................. F25D 25/025; E05C 19/02
USPC .................. 312/402, 404, 405, 215, 216, 217; 292/32, 33, 37, 38, 42, DIG. 71
See application file for complete search history.

(56) References Cited

U.S. PATENT DOCUMENTS

| | | | | |
|---|---|---|---|---|
| 4,114,933 | A * | 9/1978 | Jankelewitz et al. | 292/37 |
| 6,120,069 | A * | 9/2000 | Taranto | 292/35 |
| 6,170,276 | B1 * | 1/2001 | Mandel et al. | 62/187 |
| 6,612,116 | B2 * | 9/2003 | Fu et al. | 62/3.6 |
| 7,048,311 | B2 * | 5/2006 | Sawatani et al. | 292/33 |
| 8,052,235 | B2 * | 11/2011 | Kelly et al. | 312/404 |
| 8,590,993 | B2 * | 11/2013 | Lee et al. | 312/404 |
| 2008/0148765 | A1 * | 6/2008 | Barone et al. | 62/407 |
| 2008/0302114 | A1 * | 12/2008 | Kelly et al. | 62/170 |
| 2014/0021846 | A1 * | 1/2014 | Jung et al. | 312/404 |
| 2014/0028172 | A1 * | 1/2014 | Min et al. | 312/404 |

FOREIGN PATENT DOCUMENTS

| | | |
|---|---|---|
| CN | 101195360 A | 6/2008 |
| CN | 101324394 A | 12/2008 |
| CN | 101711332 A | 5/2010 |
| CN | 101738050 A | 6/2010 |
| CN | 102261800 A | 11/2011 |

* cited by examiner

*Primary Examiner* — Daniel Rohrhoff
(74) *Attorney, Agent, or Firm* — McKenna Long & Aldridge LLP

(57) ABSTRACT

A refrigerator includes a drawer, a sealing member disposed between a case and a front part to seal the inside of the case, a manipulation member disposed on the drawer, and a sealing apparatus for closely attaching the front part to the case and maintaining the front part closely attached to the case by the manipulation of the manipulation member. The sealing apparatus includes a hook part disposed on the case and a latch member connected to the manipulation member on the front part to move according to the manipulation of the manipulation member, thereby being inserted into the hook part, the latch member being configured so that the front part moves toward the case and is closely attached to a front surface of the case according to a contact state with the hook part.

17 Claims, 14 Drawing Sheets

REFRIGERATOR WITH SEALING APPARATUS FOR DRAWER

CROSS-REFERENCE TO RELATED APPLICATIONS

The present application claims priority under 35 U.S.C. 119 and 35 U.S.C. 365 to Korean Patent Application No. 10-2012-00080838 (filed on Jul. 24, 2012), which is hereby incorporated by reference in its entirety.

BACKGROUND

The present disclosure relates to a refrigerator including a sealing apparatus for a drawer, and more particularly, to a refrigerator including a drawer sealing apparatus by which a drawer is easily accessible.

As well-known, refrigerators are apparatuses for storing foods in a frozen or refrigerated state to keep the foods fresh for a long time.

Such a refrigerator includes a refrigerator body having a cooling chamber and a door for opening or closing the cooling chamber. A refrigeration cycle device for providing cool air into the cooling chamber is disposed in the refrigerator body.

FIG. 1 is a perspective view illustrating an example of a refrigerator according to a related art.

Referring to FIG. 1, a refrigerator includes a main body 10 having a cooling chamber 20 and a cooling chamber door 30 opening or closing the cooling chamber 20.

The cooling chamber 20 includes a freezing compartment 21 and a refrigerating compartment 22.

The cooling chamber door 30 includes a freezing compartment door 31 and a refrigerating compartment door 32 which respectively open or close the freezing compartment 21 and the refrigerating compartment 22.

A plurality of shelves 41 that vertically partition the refrigerating compartment 22 may be disposed within the refrigerating compartment 22.

A so-called vegetable storage compartment 50 for storing vegetables and/or fruits is disposed within the refrigerating compartment 22.

The vegetable storage compartment 50 may be provided in plurality.

Each of the vegetable storage compartments 50 includes a drawer that is accessible in forward and backward directions.

However, in the refrigerator according to the related art, since air within the refrigerating compartment 22 is a relatively low-temperature dry, the vegetables and/or fruits accommodated within the vegetable storage compartment 50 may be easily dried to reduce a storage period.

In consideration of the above-described limitation, a vegetable storage compartment (not shown) which is capable of sealing a vegetable storage compartment and decompressing the inside of the vegetable storage compartment at a pressure less than an atmospheric pressure is utilized.

The vegetable storage compartment having the sealing function includes a drawer sealing apparatus by which the inside of the vegetable storage compartment is maintained in a sealed state against the outside when a drawer is accommodated.

However, in the refrigerator including the drawer sealing apparatus according to the related art, the drawer sealing apparatus is configured so that a portion of components thereof is operated (rotated) in a state where the portion of the components is exposed to the outside of the drawer. Thus, it may be cumbersome to take the drawer in or out.

Also, foreign substances may be inserted into a coupling region of a component operably disposed on the outside of the drawer to interfere with the operable component.

SUMMARY

Embodiments provide a drawer sealing apparatus by which a drawer is easily accessible.

In one embodiment, a refrigerator including a drawer sealing apparatus includes: a main body having a cooling chamber; a case disposed within the cooling chamber, the case having an opened front side; a drawer including an accommodation part taken in or out of the case and a front part opening or closing the case; a sealing member disposed between the case and the front part to seal the inside of the case; a manipulation member disposed on the drawer, the manipulation member being manipulated by a user; and a sealing apparatus for closely attaching the front part to the case and maintaining the front part closely attached to the case by the manipulation of the manipulation member, wherein the sealing apparatus includes: a hook part disposed on the case; and a latch member connected to the manipulation member on the front part to move according to the manipulation of the manipulation member, thereby being inserted into the hook part, the latch member being configured so that the front part moves toward the case and is closely attached to a front surface of the case according to a contact state with the hook part.

The hook part may protrude from the front surface of the case, and an insertion hole in which the hook part is inserted may be defined in the front part.

The manipulation member may be rotatably disposed on the drawer.

Protrusions may be disposed on the manipulation member, and a slot defined to corresponding to a rotation radius of each of the protrusion to move in a state where the protrusion is accommodated therein may be defined in the latch member, wherein the slot may be defined so that a position thereof in which each of the protrusion is accommodated in a state where the case is sealed is closer to a rotation shaft of the manipulation member than a position thereof in which each of the protrusion is accommodated in a state where the sealing of the drawer is released.

The sealing apparatus may be disposed on each of both sides of the drawer, and the protrusions may be disposed to face each other with respect to the rotation shaft of the manipulation member.

The latch member may move in a direction crossing a withdrawal direction of the drawer.

An end of the latch member may include: a guide section having a thickness gradually increasing from a hook part-side end thereof toward the manipulation member; and a maintenance section having a flat surface on an end of the guide section toward the manipulation member.

An outer end of the latch member contacting the hook part may have an inclination gradually increasing inward.

A rolling contact member rolling-contacting the latch member may be disposed on the hook part.

The latch member may include: a body formed of a metal material, the body being connected to the manipulation member; and a fixed part formed of a synthetic resin material, the fixed part being disposed on an end of the body and inserted into the hook part.

A guide guiding the movement of the latch member may be further disposed on the drawer.

The refrigerator may further include a rotation pressing unit rotatably pressing the manipulation member toward the sealing or releasing position when the manipulation member rotates.

The rotation pressing unit may include: a first cam connected to the manipulation member to rotate; a second cam contacting the first cam to move in an axial direction; and a spring applying an elastic force in a direction in which the first and second cams approach each other.

The rotation pressing unit may include: an arm extending in a radius direction from a rotation shaft of the manipulation member; and a compression spring disposed flexible along a length direction of the arm on a side of the arm to apply an elastic force, thereby pressing the arm toward the sealing or releasing position.

The drawer may include the front part defining a front surface thereof and a space part covered by the front part, the manipulation member may be exposed through the front part, and the latch member may be disposed inside the space part.

The latch member may be inserted into the hook part in a state where the hook part is inserted into the space part.

A pump connected by a connection tube may be disposed on the case, and air within the case may be forcibly exhausted by an operation of the pump.

A communication part selectively opened or closed by the latch member to selectively exhaust air within the case when the manipulation member is manipulated may be defined in the drawer.

The details of one or more embodiments are set forth in the accompanying drawings and the description below. Other features will be apparent from the description and drawings, and from the claims.

DETAILED DESCRIPTION OF THE EMBODIMENTS

Exemplary embodiments of the present disclosure will be described below in more detail with reference to the accompanying drawings.

Figure 1:
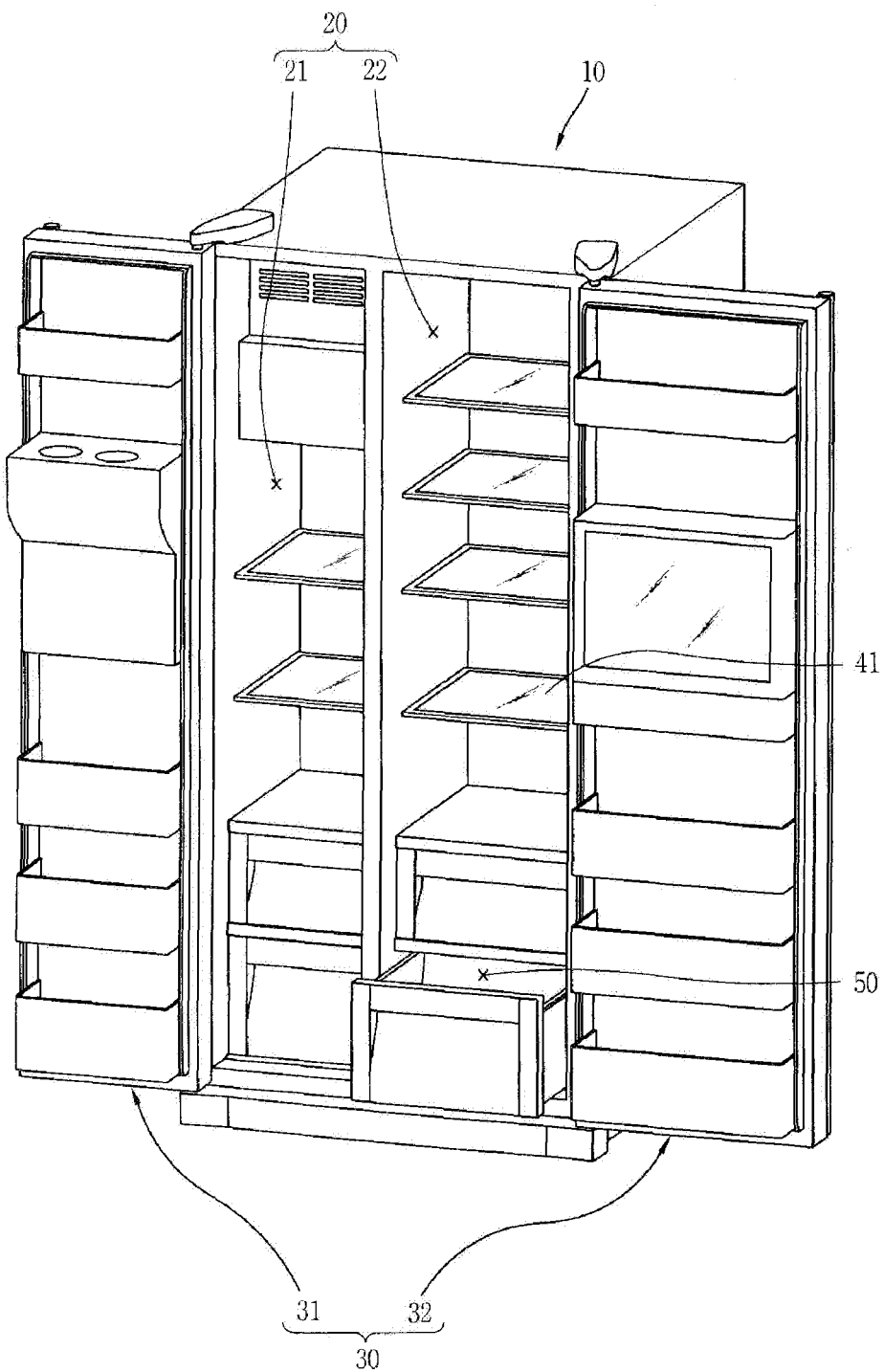
FIG. 1 is a perspective view illustrating an example of a refrigerator according to a related art.
Figure 2:
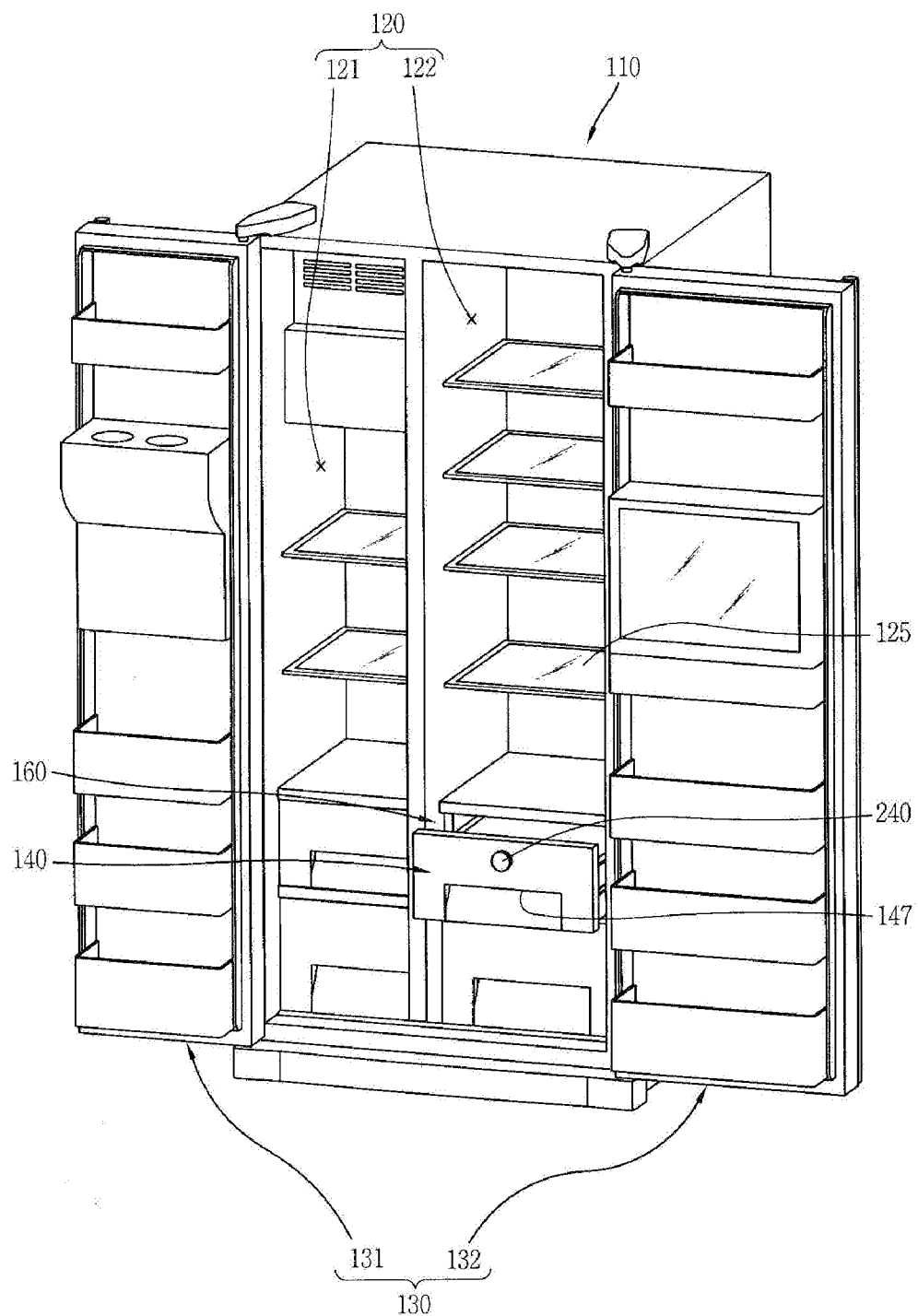
FIG. 2 is a perspective view of a refrigerator including a drawer sealing apparatus according to an embodiment.
Figure 3:
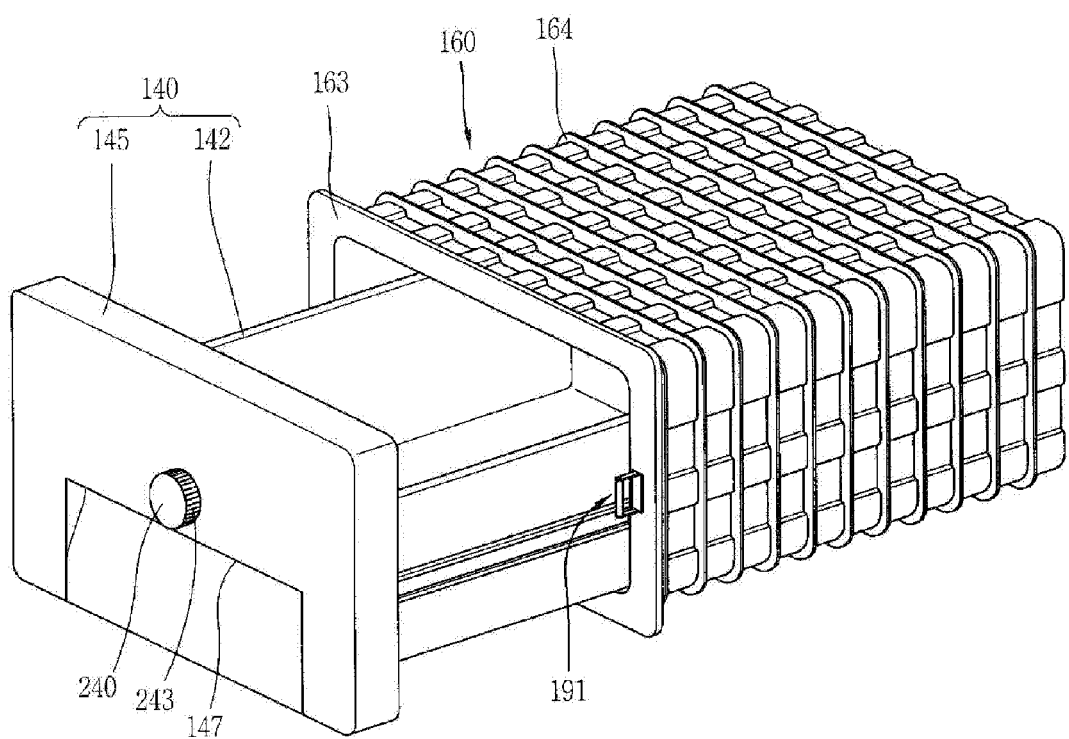
FIG. 3 is an enlarged perspective view illustrating a region of a drawer and case of FIG. 2.
Figure 4:
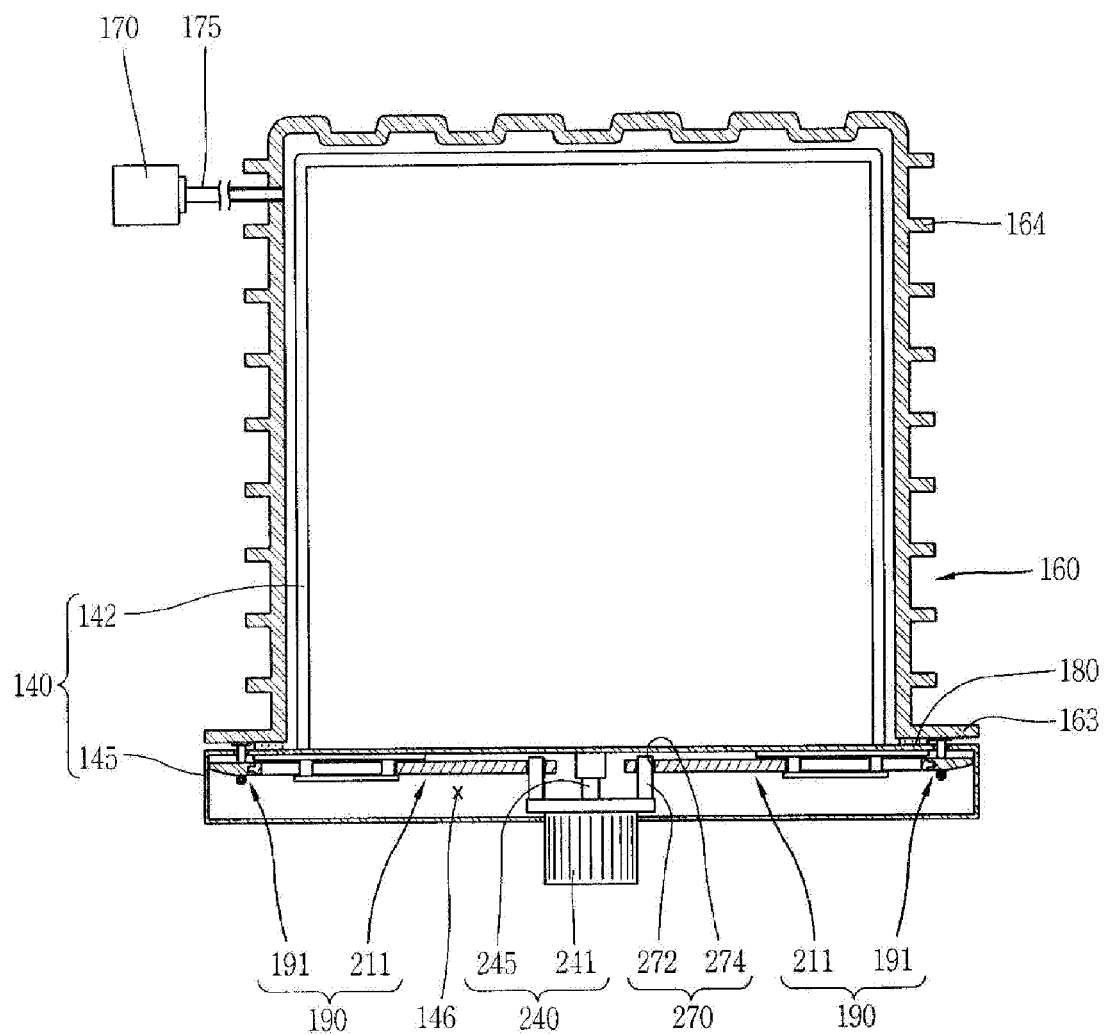
FIG. 4 is a sectional plan view of a state in which the drawer of FIG. 3 is accommodated.

Referring to FIGS. 2 to 4, a refrigerator including a drawer sealing apparatus according to an embodiment may include a refrigerator body 110 having a cooling chamber 120, a case 160 disposed within the cooling chamber 120 to define an accommodation space having an opened front side, a drawer 140 including a handle 147, the drawer 140 being withdrawably accommodated into the case 160, a sealing member 180 disposed on a contact area between the case 160 and the drawer 140 to seal the inside of the drawer 140 when the drawer 140 is accommodated, a sealing apparatus 190 including a hook part 191 disposed on the case 160 and a latch member 211 movable between a sealing position at which the latch member 211 is coupled to the hook part 191 to press the sealing member 180, thereby sealing the inside of the drawer 140 when the drawer 140 is accommodated and a releasing position at which the latch member 211 is separated from the hook part 191 to release the sealed state, and a manipulation member 240 disposed on the drawer 140 to manipulate the latch member 211 so that the latch member 211 moves between the sealing position and the releasing position. Here, the cooling chamber 120 represents a space for cooling and storing foods. The cooling chamber 120 may include, for example, a freezing compartment 121 and a refrigerating compartment 122. The refrigerator body 110 may include at least one of the freezing compartment 121 and the refrigerating compartment 122.

A plurality of cooling chambers 120 may be provided within the refrigerator body 110.

The refrigerator body 110 may include a cooling chamber door 130 for opening or closing the cooling chamber 120.

For example, the cooling chamber 120 may include the freezing compartment 121 and the refrigerating compartment 122.

The cooling chamber door 130 may include a freezing compartment door 131 and a refrigerating compartment door 132 which respectively open or close the freezing compartment 121 and the refrigerating compartment 122.

A plurality of shelves 125 that vertically partition an inner space of the refrigerating compartment 122 may be disposed within the refrigerating compartment 122.

The drawer 140 may be disposed within the refrigerating compartment 122.

The drawer 140 may be provided in plurality.

For example, the drawer 140 may be withdrawably accommodated within the case 160 defining the accommodation space having one opened side.

The case 160 may have an opening facing a front side. Thus, the drawer 140 may be taken in or out along front or rear directions of the refrigerating compartment 122. Here, the case 160 may be disposed so that the opening of the case 160 faces a left or right side of the refrigerating compartment 122.

For example, the case 160 may have a rectangular parallelepiped shape with a front surface opened. In more detail, the case 160 may have the opening in the front surface thereof, and remaining five surfaces of the case 160 may be blocked.

A pump (a vacuum pump) 170 for discharging air within the accommodation space of the case 160 to decompress the accommodation space of the case 160 may be disposed on a side of the case 160. A connection tube 175 may communicably connected between the pump 170 and the case 160. Thus, the air within the case 160 may be suctioned into or discharged from the pump 170 through the connection tube 175 to decompress the inside of the case 160 at a pressure less than an atmospheric pressure.

A flange part 163 that is expanded outward may be disposed on the front surface of the case 160.

For example, the case 160 may be formed of a synthetic resin material.

A plurality of ribs 164 may be disposed on an outer surface of the case 160. Thus, the case 160 may be restrained in deformation.

For example, the drawer 140 may include an accommodation part 142 defining an accommodation space for accommodating foods therein and a front part 145 disposed on a front surface of the accommodation part 142.

For example, the front part 145 may have a size greater than that of the accommodation part 142. In more detail, the front part 145 may have a size corresponding to that of the flange part 163 of the case 160.

The front part 145 may have an approximately rectangular plate shape (a rectangular parallelepiped shape).

A space part 146 may be provided within the front part 145.

The handle 147 that is used for taking the drawer 140 in or out may be disposed on the front part 145.

For example, the handle 147 may be disposed in a lower portion of the front part 145.

For example, the handle 147 may be recessed by a predetermined distance from a surface of the front part 145 to define a grasping space.

The sealing member 180 may be disposed between the front part 145 and the flange part 163 of the case 160. Thus, when the drawer 140 is accommodated, the inside of the case 150 may be sealed against the outside.

For example, the sealing member 180 may be formed of a rubber material.

The sealing member 180 may have a close loop shape (a square ring shape) along a circumferential direction of the flange part 163.

The drawer sealing apparatus 190 for maintaining the sealed state of the drawer 140 and the case 160 against the outside when the drawer 140 is accommodated may be disposed on the drawer 140 and the case 160.

Figure 5:
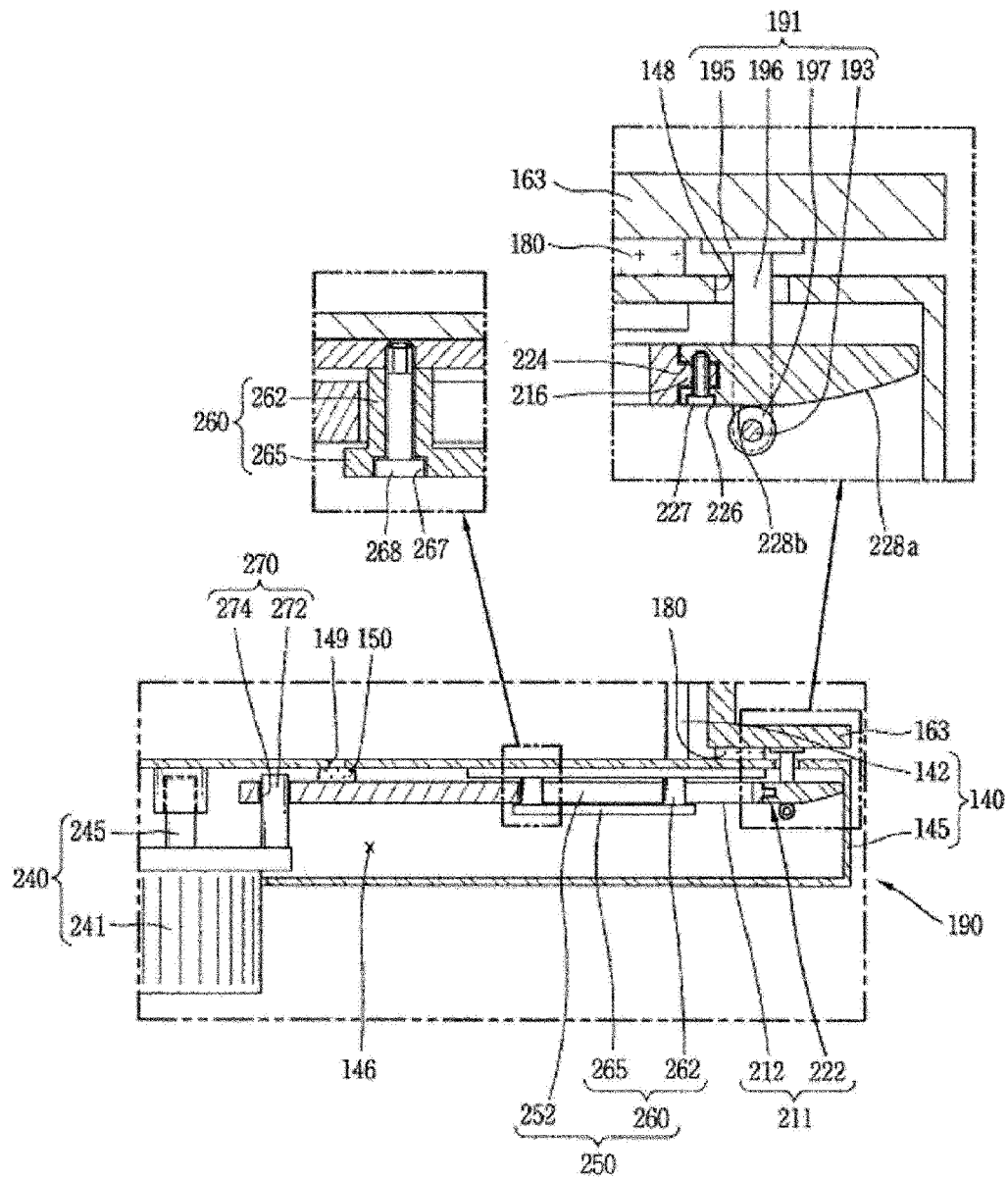
FIG. 5 is an enlarge view illustrating a main part of FIG. 4.

For example, as shown in FIG. 5, the drawer sealing apparatus 190 may include the hook part 191 disposed on the case 160 and the latch member 211 movable between the sealing position at which the latch member 211 is coupled to the hook part 191 to press the sealing member 180, thereby sealing the inside of the drawer 140 when the drawer 140 is accommodated and the releasing position at which the latch member 211 is separated from the hook part 191 to release the sealed state.

The hook part 191 may protrude from the front surface of the case 160.

The hook part 191 may be provided in plurality.

The hook part 191 may protrude from the flange part 163.

For example, two hook parts 191 may be provided and then respectively disposed on both sides of the flange part 183.

Each of the hook parts 191 may be inserted into an insertion hole 148 defined in the drawer 140 when the drawer 140 is accommodated.

The insertion hole 148 may be defined in a back surface of the front part 145 of the drawer 140 to pass through the front part 145 in a rear direction.

Each of the hook parts 191 may be configured so that an end of the latch member 211 is inserted therein.

In detail, the hook part 191, for example, may include a contact part contacting the latch member 211 and a fixing support part 195 connected to the contact part 193 through a connection part 196 to allow the contact part 193 to be fixed and supported to the case 160.

For example, the contact part 193 may be vertically disposed in a state where the contact part 193 is spaced apart from a front end of the case 160.

For example, the fixing support part 195 may have a rectangular plate shape.

The fixing support part 195 may include the connection part 196 connected to upper and lower ends of the contact part 193 to support the contact part 193.

The hook part 192 may include a rolling contact member 197 rolling-contacting the latch member 211.

The rolling contact member 197 may have a cylindrical shape.

The rolling contact member 197, for example, may be rotatably disposed on the contact part 193.

The latch member 211 may include a body 212 movable transversely in a withdrawal direction of the drawer 140 and a fixed part 222 coupled to an end of the body 212 and then coupled to the hook part 191.

For example, the body 212 may be formed of a metal material having high strength, and the fixed part 222 may be formed of a synthetic resin material.

For example, the body 212 may be provided as a long plate-shaped member having a length greater than a width thereof.

An extension part 214 extending in a width direction thereof may be disposed on an end of the body 212.

For example, the extension part 214 may have an arc shape.

Here, a communication part 149 blocked by the latch member 211 when the latch member 211 is disposed at the sealing position may be disposed in the drawer 140.

The communication part 149 may be opened when the latch member 211 is disposed at the releasing position to allow the inside of the drawer 140 to communicate with the outside.

A fixed part coupling part 216 may be disposed on the other end of the body 212 so that the fixed part 222 is coupled thereto.

For example, the fixed part coupling part 216 may be formed by cutting an end of the body 212 in a thickness direction thereof.

An accommodation part 224 recessed so that the fixed part 222 is inserted into the fixed part coupling part 216 may be defined in the fixed part 222.

The fixed part 222 may have an guide section 228a having a thickness that gradually increases form a hook part-side end thereof toward the manipulation member 240 and a maintenance section 228b having a flat surface on a side of the guide section 228a. For this, the latch member 211 may inclinedly contact the hook part 191 in the guide section 228a when the latch member 211 moves at the sealing position to act as a "wedge", thereby being easily coupled with relatively less manipulation force. Also, the maintenance section 228b may have the flat surface disposed in a transverse direction with respect to a pressing direction of the sealing member 180 to stably maintain the sealed state due to the pressed sealing member 180.

A coupling member coupling part 226 coupled to the coupling member 227 may be disposed on the fixed part 222.

The coupling member coupling part 226 may pass through the maintenance section 228b.

The coupling member 227 may be screw-coupled to the body 212.

A through hole having a female screw shape so that the coupling member 227 is screw-coupled may be further defined in the fixed part coupling part 216 of the body 212.

The drawer 140 may include a guide 250 for guiding the movement of the latch member 211.

For example, the guide 250 may include a through part 252 passing along the movement direction of the latch member 211 and a guide member 260 inserted into the through part 252 to guide the movement of the latch member 211.

The guide member 260 may include an insertion part 262 inserted into the through part 252 and a separation prevention part expanded from a side of the insertion part 262 to prevent the guide member 260 from being separated.

Top and bottom surfaces of the through part 252 and top and bottom surfaces of the insertion part 262 may be slidably disposed parallel to each other.

The separation prevention part 265 may have a width greater than that of the through part 252. Thus, a circumference of the through part 252 may contact the separation prevention part 265 to restrain separation of the latch member 211.

The guide member 260 may include a coupling member coupling part 267 so that guide member 260 is fixed to the drawer 140 by a coupling member 268. The coupling member 268 may be inserted into the coupling member coupling part 267 and then be screw-coupled to the drawer 140.

The manipulation member 240 for manipulating the drawer sealing apparatus may be disposed on the drawer 140.

For example, the manipulation member 240 may be manipulated so that the latch member 211 is movable between the sealing position and the releasing position.

For example, the manipulation member 240 may be rotatably disposed on the drawer 140.

For example, the manipulation member 240 may include a rotation shaft 245 and a circular knob rotating about the rotation shaft 245.

A slide prevention part 243 for preventing the knob 241 from being slid when the knob rotates may be disposed on the knob 241. For example, the slide prevention part 243 may include an uneven part protruding and/or recessed in a radius direction thereof.

The extension part 214 of the latch member 211 may be disposed on a rear side of the manipulation member 240.

A power transmission part 270 for transmitting a driving force of the manipulation member 240 to the latch member 211 may be disposed between the manipulation member 240 and the latch member 211.

For example, the power transmission member 270 may include a protrusion 272 disposed on the manipulation member 240 and a slot 274 relatively movably disposed on the latch member 211 to accommodate the protrude 272.

The protrusion 272 protruding along an axial direction may be disposed on a back surface of the manipulation member 240.

For example, two protrusions 272 may be provided.

The protrusions 272 may be disposed to face each other with respect to a rotation axis line.

The slot 274 may pass through an extension-side end of the latch member 211.

For example, the slot 274 may have a width (an inner width) enough to accommodate the protrusion 272 and be defined to pass along a movement trace of the protrusion 272 with when the manipulation member 240 rotates.

Here, the slot 274 may be configured so that a sealing position-side end 275b of the protrusion 272 that is accommodated when the protrusion 272 is disposed at the sealing position is further close to the rotation shaft 245 of the manipulation member 240 than a releasing position-side end 275a of the protrusion 272 that is accommodated when the protrusion 272 is disposed at the releasing position. Thus, the latch member 211 may be relatively movable with respect to the manipulation member 240 by a difference of a distance between the rotation shaft 245 and the releasing position-side end 275 and a distance between the rotation shaft 245 and the sealing position-side end 275b.

Figure 6:
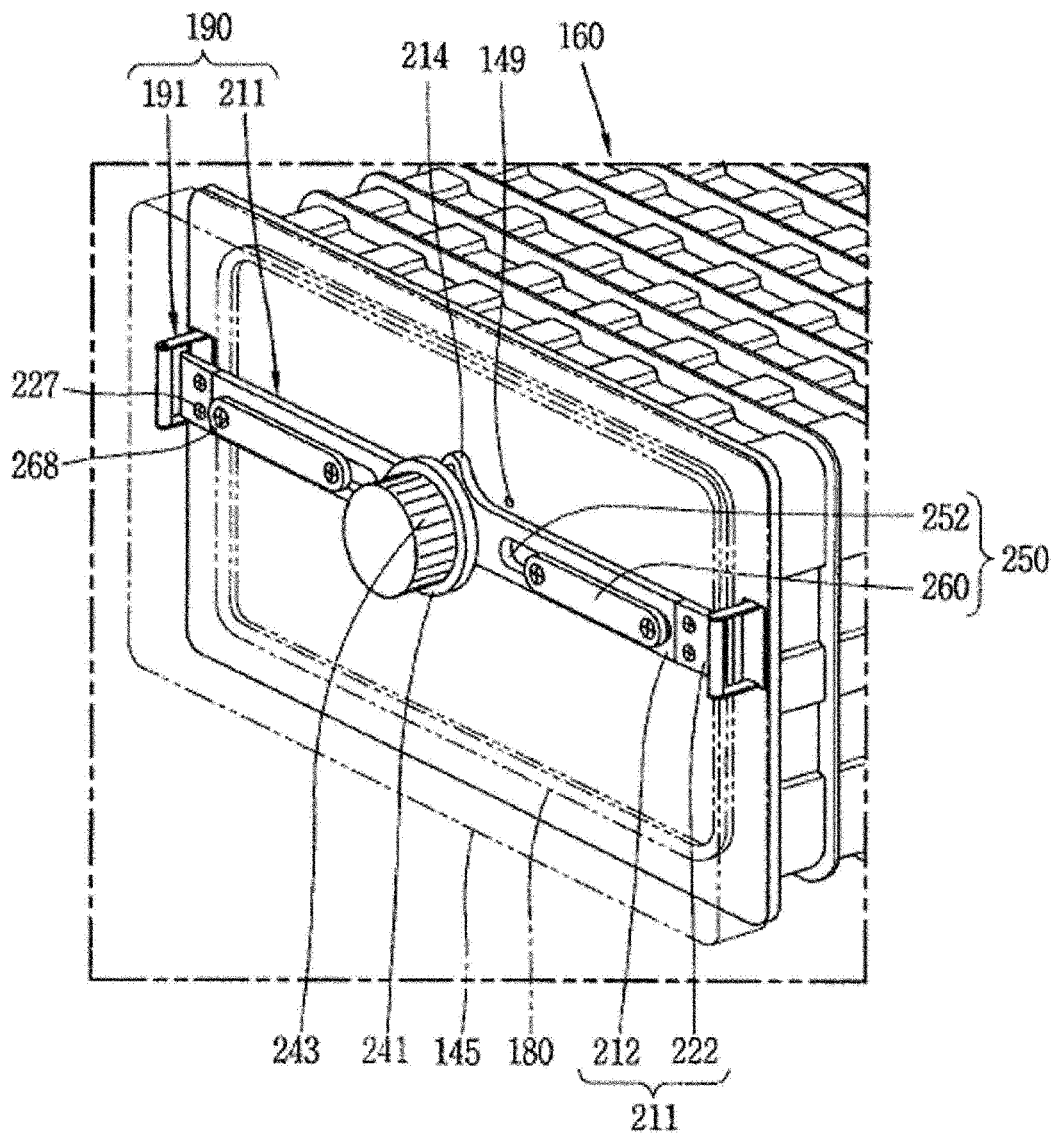
FIG. 6 is a perspective view illustrating a sealing position of a latch member of FIG. 4.

As a result, as shown in FIG. 6, the manipulation member 240 may be disposed at the releasing position before the drawer 140 is accommodated in the case 160.

Figure 7:
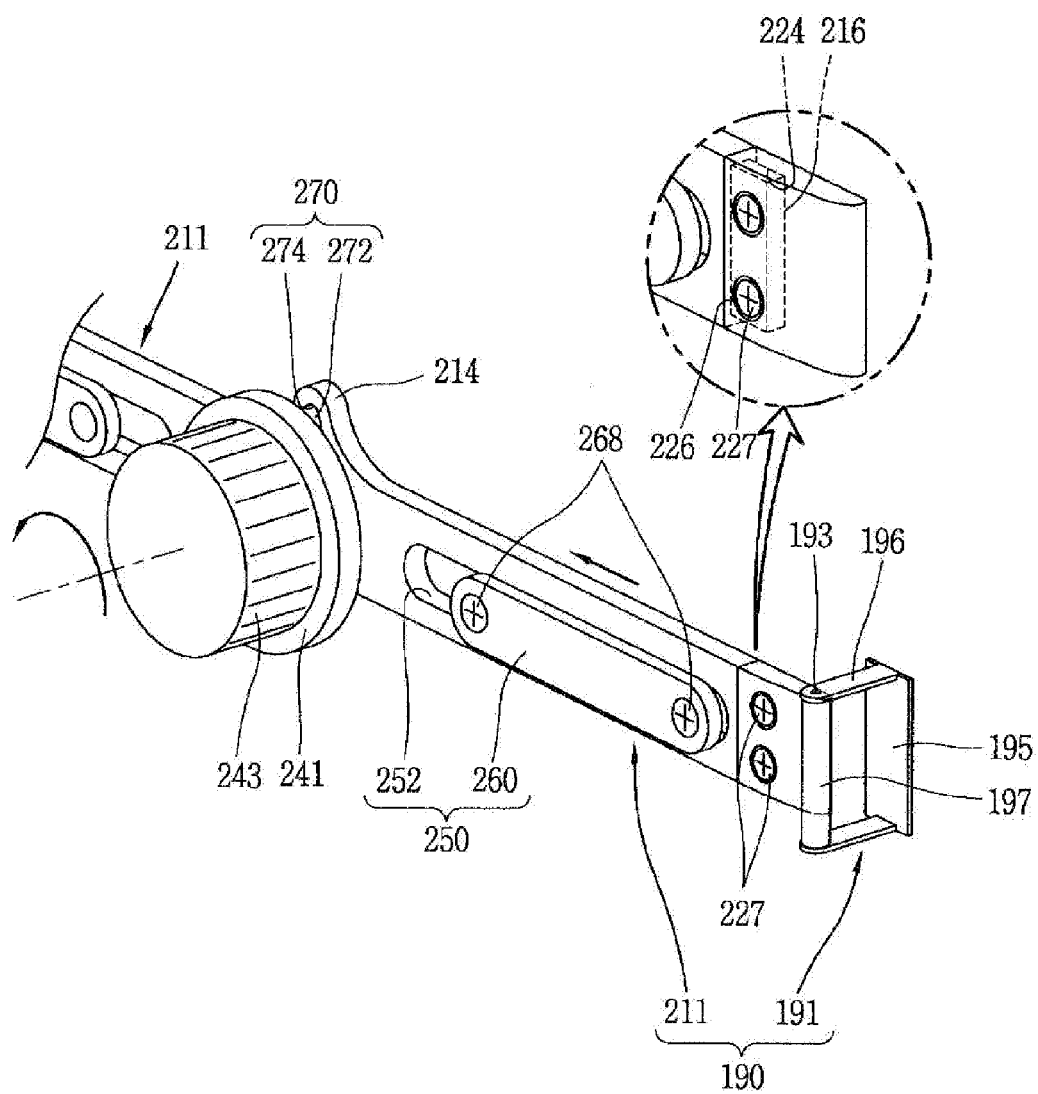
FIG. 7 is an enlarged view illustrating a main part of FIG. 6.

When the manipulation member 240 is disposed at the releasing position, as shown in FIG. 7, the protrusion 272 may move in a state where the protrusion 272 is close to an upper circumference of the manipulation member 240. Thus, the latch member 211 may be pulled by the protrusion 272 to move toward the manipulation member 240.

When the drawer 140 is accommodated in the case 160, the sealing member 180 may contact the flange part 163 of the case 160. Here, the hook part 191 may be inserted into the insertion hole 148 defined in the back surface of the front part 145 of the drawer 140.

When it is intended to seal the inside of the drawer 140, the manipulation member 240 may be manipulated in a clockwise direction in the drawings to rotate to the sealing position.

Figure 8:
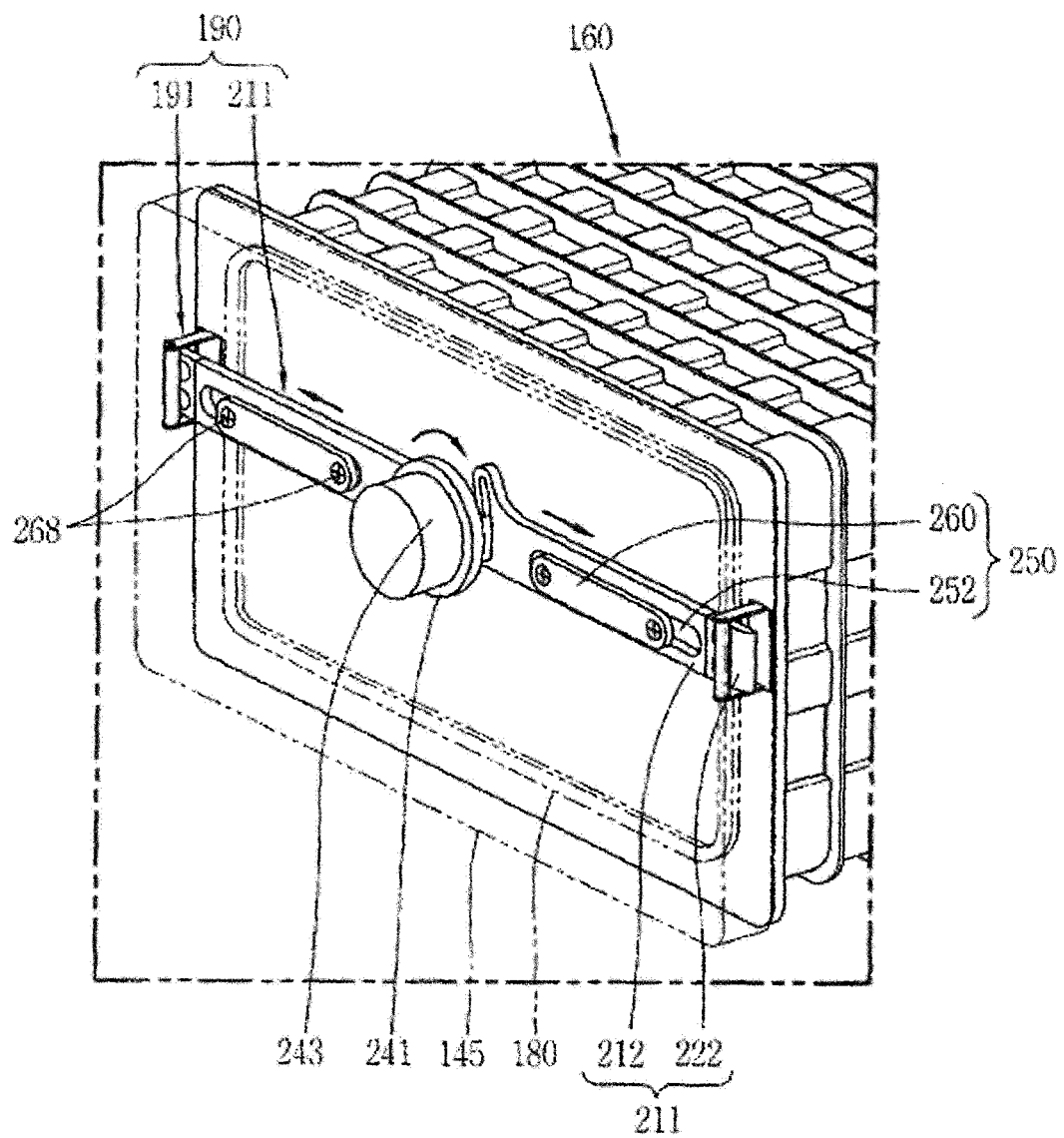
FIG. 8 is a perspective view illustrating a releasing position of the latch member of FIG. 4.
Figure 9:
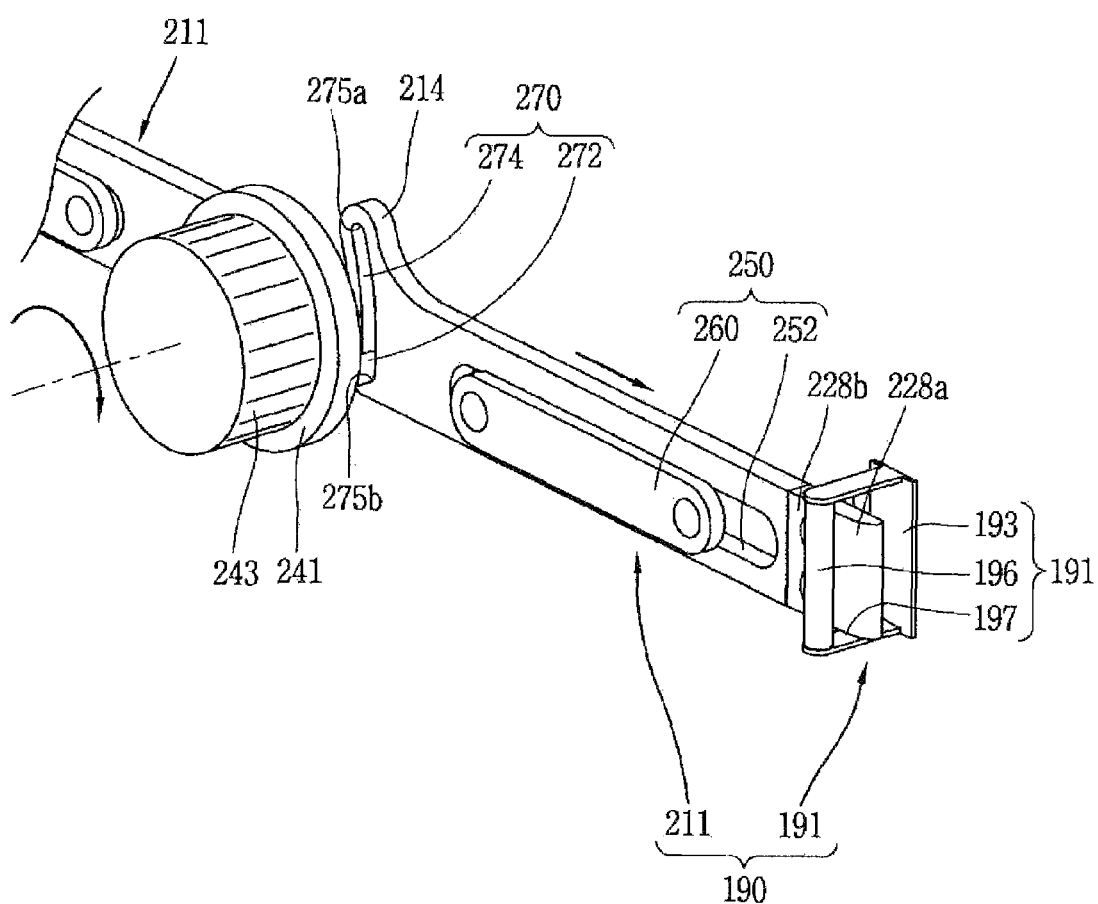
FIG. 9 is an enlarge view illustrating a main part of FIG. 8.

As shown in FIGS. 8 and 9, when the manipulation member 240 rotates in the clockwise direction, the protrusion 272 rotates in the clockwise direction with respect to the rotation shaft 245. Thus, as the protrusion 272 rotates, the latch member 211 may be pressed to move outward.

The latch member 211 may slidably move toward the outside of the front part 145 of the drawer 140.

When the latch member 211 moves, the maintenance section 228b of the latch member 211 may contact the rolling contact member 197 of the corresponding hook part 191.

The rolling contact member 197 may contact the corresponding maintenance section 228b to rotate by a friction force therebetween. As a result, resistance may be reduced.

As the latch member 211 moves outward, the maintenance section 228b may gradually increase in thickness. As a result, the drawer 140 may be pressed and then closely attached toward the case 160. Accordingly, when the sealing member 180 may be further pressed and thus be closely attached to the drawer 140 and the case 160 to improve sealing performance.

When the manipulation member 240 completely rotates to the sealing position, the maintenance section 228b of the latch member 211 contacts the rolling contact member 197. Thus, the sealed state of the drawer 140 may be stably maintained.

When the manipulation member 240 rotates to the sealing position, the inside of the drawer 140 and the case 160 may be decompressed (vacuum state) to a preset pressure less than the atmospheric pressure.

If it is intended to release the sealed state of the drawer 140, the manipulation member 240 may be manipulated in a counterclockwise direction in the drawings to rotate to the releasing position.

As shown in FIG. 7, when the manipulation member 240 rotates in the counterclockwise direction, the protrusion 272 rotates in the counterclockwise direction with respect to the rotation shaft 245. Thus, the latch member 211 may be pulled toward the manipulation member 240 to slidably move toward the manipulation member 240.

When the latch member 211 moves to the releasing position, the communication part 140 may be opened. Thus, air may be introduced into the case 160 to release the vacuum state of the inside of the case 160 (the inside and the outside of the case 160 may have substantially the same pressure). As a result, the drawer 140 may be easily withdrawn.

When the latch member 211 moves to the releasing position, the fixed part 222 may be separated from the rolling contact member 197, and thus the coupled state of the fixed part 222 may be released. Accordingly, the drawer 140 may be in a withdrawable state.

When it is intended to withdraw the drawer 140, the manipulation member 240 rotates to the releasing position, and then the handle 147 is pulled forward to withdraw the drawer 140.

Figure 10:
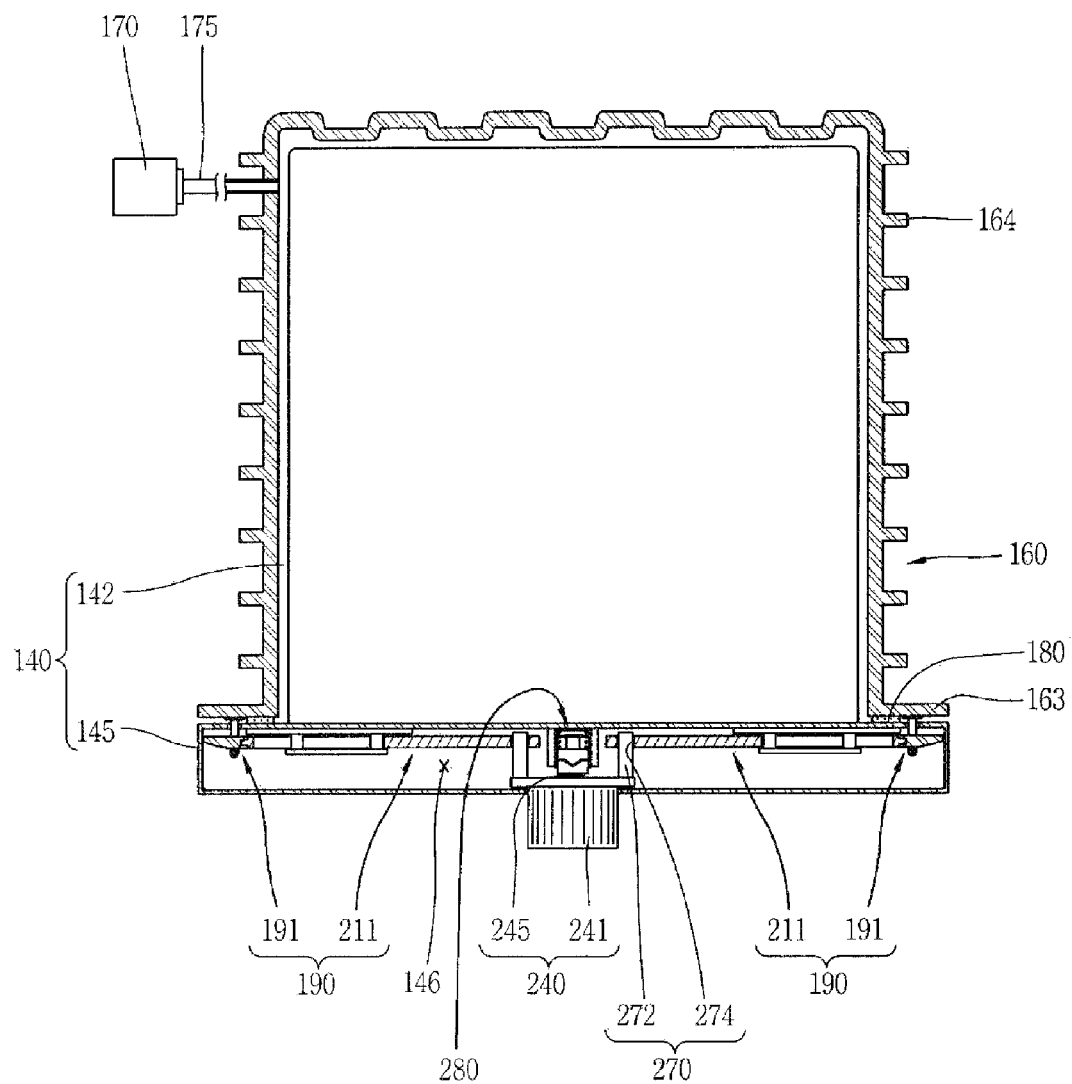
FIG. 10 is a sectional plan view of a refrigerator including a drawer sealing apparatus according to another embodiment.

Hereinafter, another embodiment will be described with reference to FIGS. 10 and 11.

For convenience of description in the drawings, the same constitution and feature as the foregoing components will be omitted and denoted by the same reference numeral.

Also, descriptions with respect to the same component as that of the foregoing embodiment will be omitted below.

Figure 11:
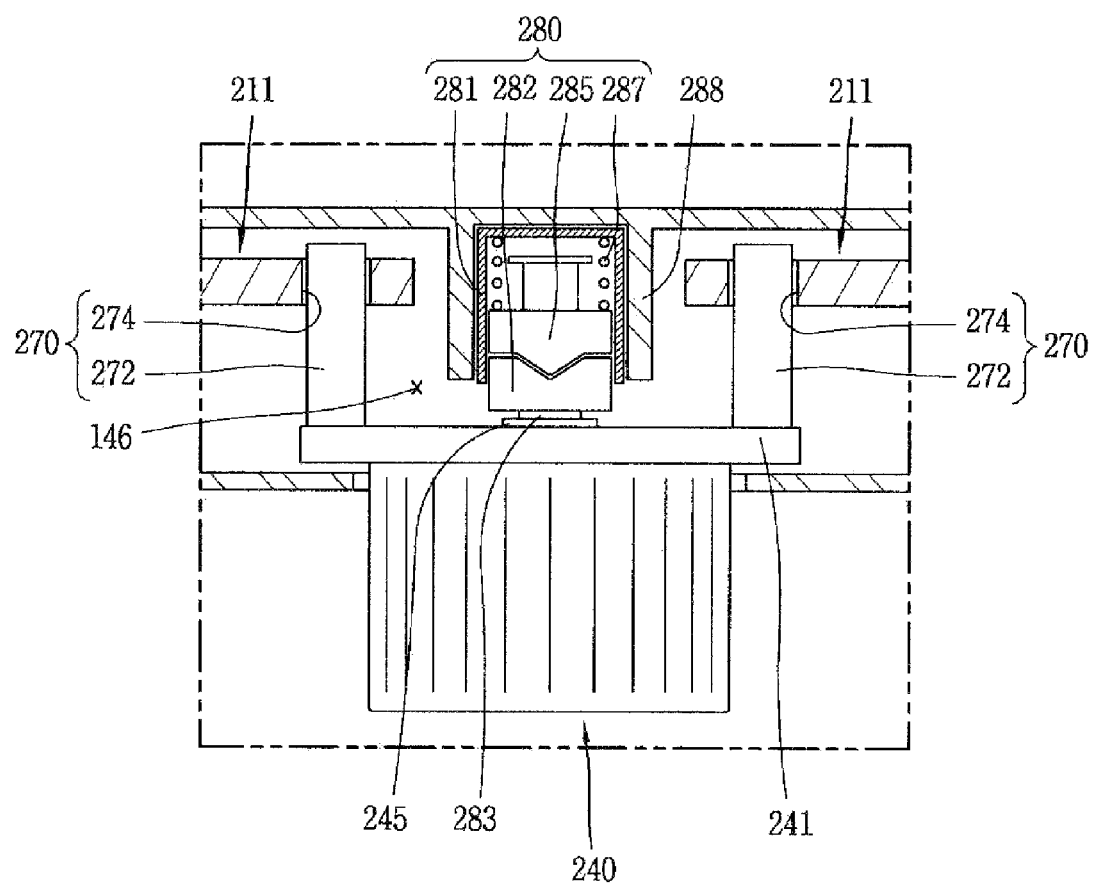
FIG. 11 is a cross-sectional view of a rotation pressing unit of FIG. 10.
Figure 12:
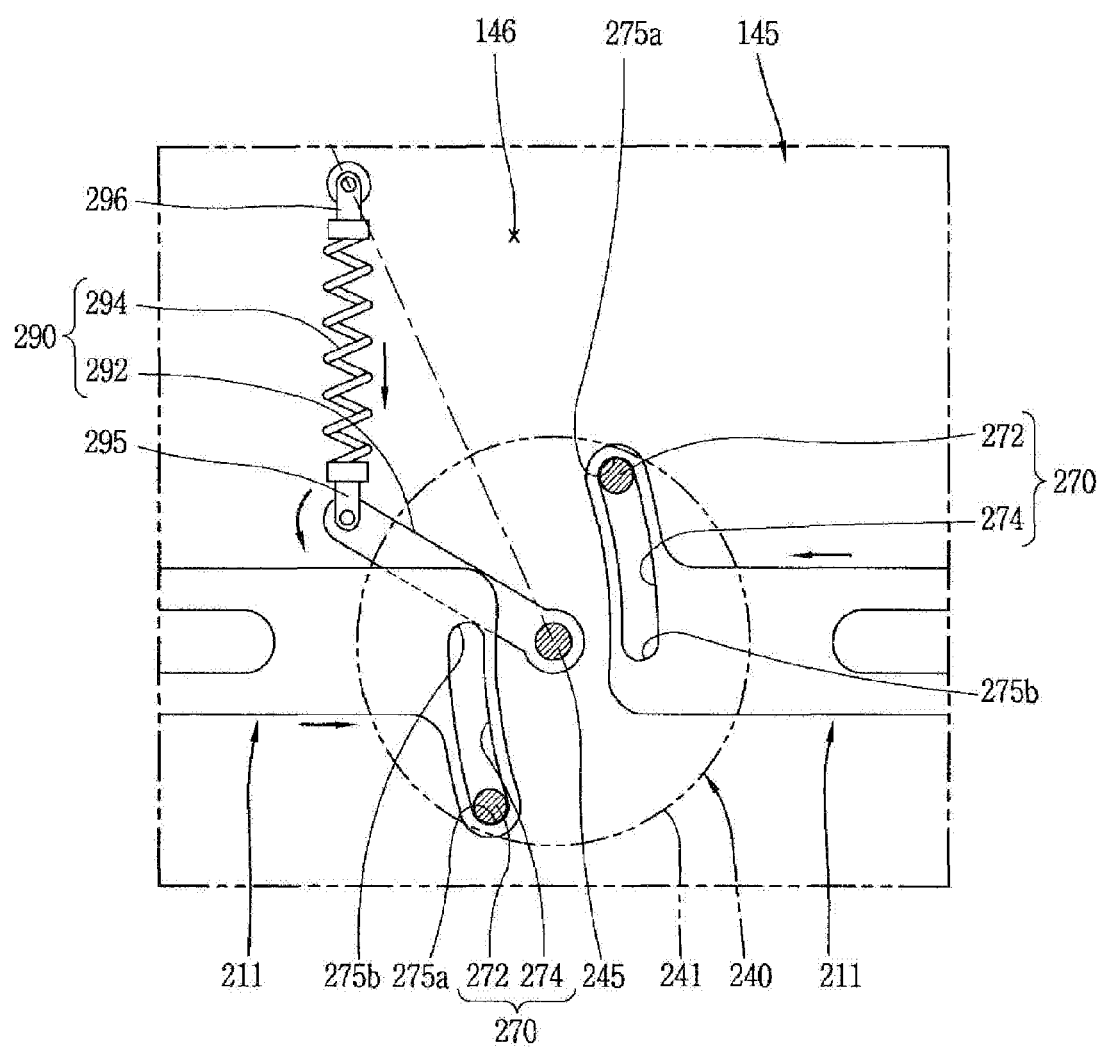
FIG. 12 is a view illustrating a rotation pressing unit of a refrigerator including a drawer sealing apparatus according to further another embodiment.

A drawer sealing apparatus according to another embodiment, as shown in FIGS. 11 and 12, may further include a rotation pressing unit 280 for rotatably pressing a manipulation member 240 toward a sealing or releasing position when the manipulation member 240 rotates.

For example, as shown in FIG. 11, the rotation pressing unit 280 may include a first cam 282 connected to the manipulation member 240 to rotate, a second cam 285 contacting the first cam 282 to move in an axial direction, and a spring 287 applying an elastic force in a direction in which the first and second cams 282 and 285 approach each other. Here, each of the first and second cams 282 and 285 may have a cam profile corresponding to a rotation angle between a sealing position and a releasing position of the manipulation member 240.

The rotation pressing unit 280 may include a housing 281 defining an accommodation space therein.

A housing accommodation part 288 for accommodating and supporting the housing 281 may be provided in the drawer 140.

The second cam 285 and the spring may be accommodated within the housing 281.

The second cam 285 may be accommodated within the housing 281 so that the second cam 285 may be restrained in rotation and movable in an axial direction.

A compression spring may be used as the spring 287.

The spring 287 may be accommodated into a side of the second cam 285 to accumulate an elastic force while being compressed by the movement of the second cam 285. Then, the spring 287 may allow the second cam 285 to press the first cam 282 through the elastic force.

In more detail, the manipulation member 240 may rotate at an angle of about 60 degrees to about 80 degrees from the releasing position to the sealing position.

For example, when the manipulation member 240 rotates at an angle of about 70 degrees, each of the first and second cams 282 and 285 may relatively rotate at an angle of about 70 degrees. The first and second cams 282 and 285 are configured so that the spring 287 may be maximally extended from the sealing position to the releasing position and maximally compressed at a middle point (e.g., a point rotating at an angle of about 35 degrees) between the sealing position and the releasing position.

Thus, when the first cam 282 relatively rotates with respect to the second cam 285 by the manipulation member 240, the second cam 285 may move so that the spring 287 is constructed along the axial direction.

When the second cam 285 is away from the first cam 282, the spring 287 may accumulate the elastic force. On the other hand, when the second cam 285 approaches the first cam 282, the spring 287 may press the second cam 285 by using the elastic force. Thus, the first cam 282 may be pressed in a rotation direction of the second cam 285 to more quickly rotate.

A coupling part 283 may be disposed on the first cam 282 so that the first cam 282 is coupled to a rotation shaft 245 of the manipulation member 240. The coupling part 283 may forwardly or reversely rotate together with the rotation shaft 245.

Thus, the manipulation member 240 may be disposed at the releasing position before the drawer 140 is accommodated within the case 160.

When the drawer 140 is accommodated in the case 160, the sealing member 180 may contact a flange part 163.

When it is intended to seal the inside of the drawer 140, the manipulation member 240 may rotate to the sealing position.

Thus, when the manipulation member 240 rotates in a clockwise direction in the drawings, the first cam 282 may relatively rotate with respect to the second cam 285. Thus, the second cam 285 is pressed by the first cam 282 to move away from the first cam 282. Here, the spring 287 may accumulate the elastic force while being compressed.

When the manipulation member 240 continuously rotates to reach the middle point, the spring 287 may be maximally compressed.

When the manipulation member 240 continuously rotates, the first cam 282 may pass through the middle point. Thus, the second cam 285 may be pressed to move toward the first cam 282 by the elastic force of the spring 287. The first cam 282 may quickly moves to the sealing position by the pressing force of the second cam 285.

When the manipulation member 240 starts the rotation thereof from the releasing position to the sealing position, a protrusion 272 rotates about the rotation shaft 245. Thus, a latch member 211 may slidably move toward both sides of a front part 145 of the drawer 140 by the pressing of the protrusion 272.

When the latch member 211 moves toward both sides of the front part 145, a fixed part 222 contacts a corresponding rolling contact member 197 to move. Thus, the drawer 140 and the case 160 may approach each other, and then the sealing member 180 may be compressed (closely attached).

When the manipulation member 240 rotates to the sealing position, a pump 170 operates so that the inside of the case 160 is decompressed to a preset pressure less than an atmospheric pressure.

When it is intended to withdraw the drawer 140, the manipulation member 240 may rotate to the releasing position, and then the handle 147 may be pulled forward to withdraw the drawer 140.

Hereinafter, further another embodiment will be described with reference to FIGS. 12 and 14.

Figure 14:
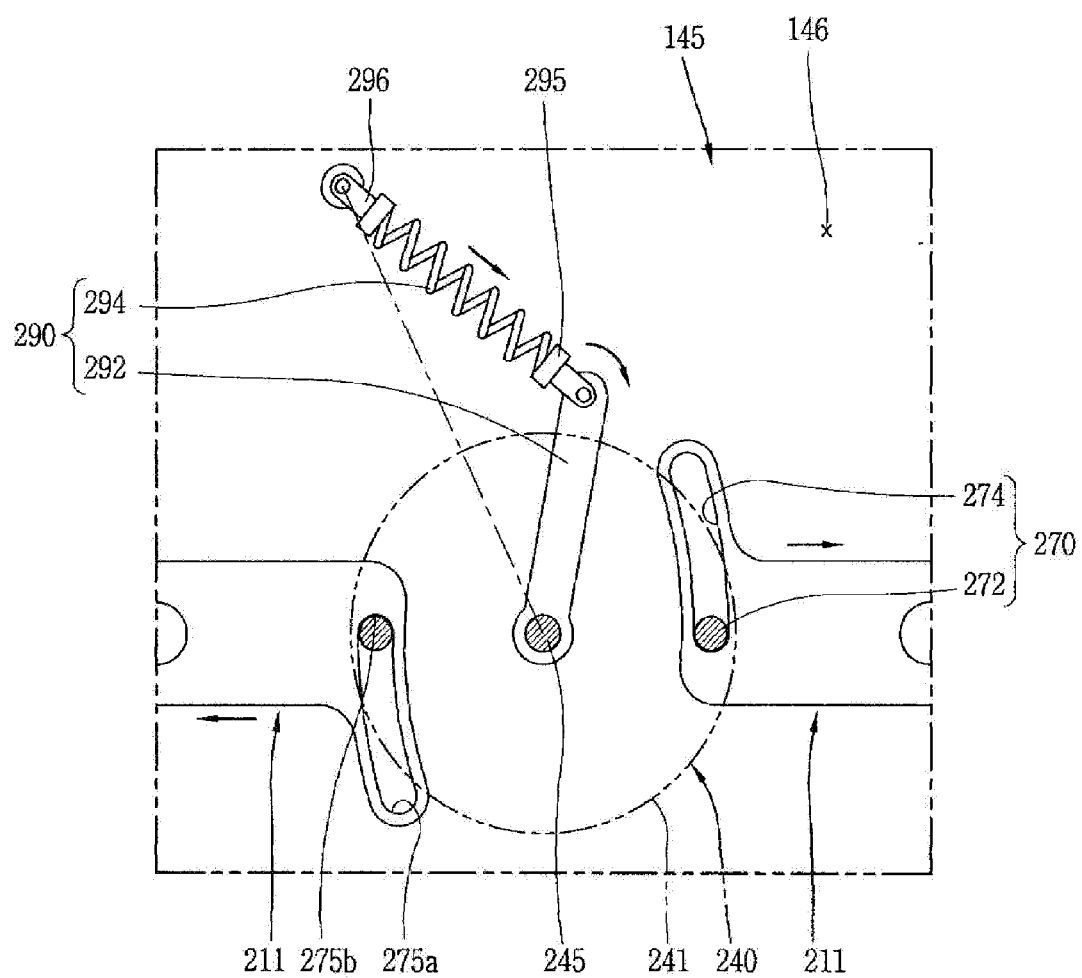

A drawer sealing apparatus according to further another embodiment, as shown in FIGS. 12 and 14, may further include a rotation pressing unit 290 for rotatably pressing a manipulation member 240 toward a sealing or releasing position when the manipulation member 240 rotates.

The rotation pressing unit 290 may include an arm 292 extending in a radius direction from a rotation shaft 245 of the manipulation member 240 and a pressing spring 294 disposed flexible in a length direction of the arm 292 on a side of the arm 292 to apply an elastic force, thereby pressing the arm 292 toward a sealing or releasing position.

For example, the arm 292 may be disposed in a rear side of the latch member 211 along an axial direction of the rotation shaft 245.

For example, the pressing spring 294 and the arm 292 may be disposed in a straight line at a middle point between the sealing position and the releasing position. Thus, the pressing spring 294 may be maximally compressed at the middle point between the sealing position and the releasing position to accumulate the elastic force. Then, the pressing spring 294 may press the arm 292 by the accumulated elastic force to rotate to the releasing or sealing position.

For example, a compression coil spring may be used as the pressing spring 294.

First and second connection members 295 and 296 connecting the compression spring 294 may be disposed on each of both ends of the compression spring 294.

The first connection member 295 may have one side inserted into and coupled to an end of the compression spring 294 and the other side relatively movably (e.g., rotatably) connected to an end of the arm 292.

The second connection member 296 may have one side inserted into and coupled to the end of the compression spring 294 and the other side relatively movably (e.g., rotatably) connected to a drawer 140.

Thus, the manipulation member 240 may be disposed at the releasing position before the drawer 140 is accommodated within a case 160.

When the drawer 140 is accommodated in the case 160, a sealing member 180 may contact a flange part 163. Here, a hook part 191 may be inserted into an insertion hole 148.

When it is intended to seal the inside of the drawer 140, the manipulation member 240 may rotate to the sealing position.

When the manipulation member 240 rotates in a clockwise direction in the drawings, the arm 292 may rotate.

Figure 13:
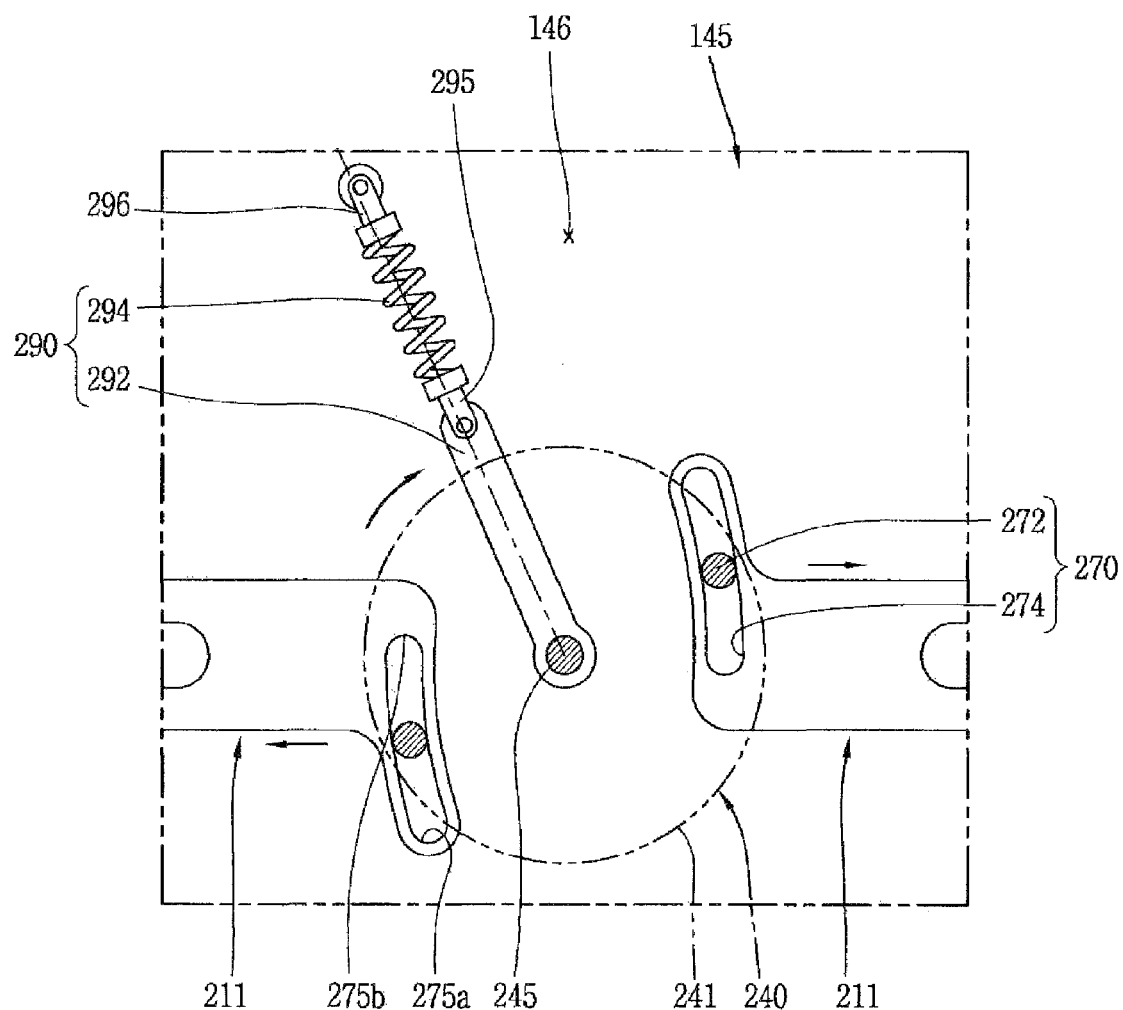
FIGS. 13 and 14 are a view illustrating an operation of the rotation pressing unit of FIG. 12.

When the arm 292 rotates, the compression spring 294 may accumulate an elastic force while being compressed. As a result, as shown in FIG. 13, the compression spring 294 and the arm 292 may be disposed in a straight line at the middle point, and thus, the compression spring 294 may be maximally compressed.

When the manipulation member 240 continuously rotates to allow the arm 292 to pass through the middle point, the compression spring may press the arm 292 to the sealing position by using the accumulated elastic force.

Thus, as shown in FIG. 14, the manipulation member 240 may quickly rotate to the sealing position. As a result, a latch member 211 may quickly move to the sealing position due to the rotation of the manipulation member 240.

When the latch member 211 moves toward both sides of a front part 145, a fixed part 222 contacts a corresponding rolling contact member 197 to move. Thus, the drawer 140 and a case 160 may approach each other, and then the sealing member 180 may be compressed (closely attached).

When the manipulation member 240 rotates to the sealing position, a pump 170 operates so that the inside of the case 160 is decompressed to a preset pressure less than an atmospheric pressure.

When it is intended to withdraw the drawer 140, the manipulation member 240 may rotate to the releasing position, and then the handle 147 may be pulled forward to withdraw the drawer 140.

Hereinbefore, exemplary embodiments of the present disclosure were described with reference to the drawings. It will be understood that various changes in form and details may be made therein without departing from the spirit and scope of the invention as defined by the appended claims.

Also, even though embodiments are not described one by one in the forgoing detailed description, the embodiments should be widely interpreted within a range of technical ideas defined in the appended claims. Thus, it is intended that the present disclosure covers the modifications and variations of this invention provided they come within the scope of the appended claims and their equivalents.

As described above, according to the embodiments, since the handle of the drawer and the manipulation switch are separately provided, the drawer may be easily taken in or out.

Also, since all operable components except for the manipulation member are accommodated in an inner wall of the drawer, unnecessary restriction therebetween when the components operate may be prevented to secure operation reliability.

Also, since the latch member has the guide section having a thickness gradually increasing from the hook part-side end thereof toward the manipulation member and the maintenance section having the flat surface on a side of the guide section, even though the manipulation member is pressed by using a relatively less manipulating force, the sealing force may be improved. Also, the drawer may be closely attached and also fixed in the closely attached state through the manipulation of the manipulation member.

Also, since the rotation pressing unit for pressing the manipulation member to rotate to the sealing or releasing position when the manipulation member is manipulated is provided, the manipulation member may be more easily manipulated. In addition, the latch member may accurately move to the sealing or releasing position to improve the operation reliability.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
   a main body having a cooling chamber;
   a case disposed within the cooling chamber, the case having an opened front side;
   a drawer comprising:
      an accommodation part withdrawably accommodated in the case; and
      a front part forming a front surface of the accommodation part and configured to open or close the opened front side of the case;
   a sealing member interposed between the case and the front part;
   a manipulation member rotatably disposed on the drawer;
   a sealing apparatus operably coupled to the manipulation member, the sealing apparatus comprising:
      a latch member connected to the manipulation member to move in a width direction of the front part by the rotation of the manipulation member; and
      a latch receiving member protruding from the front surface of the case and having a hole through which one end of the latch member passes by moving in the width direction of the front part,
      wherein when the end of the latch member passes through the hole of the latch receiving member, the front part is configured to move in a depth direction of the case to be strongly attached to the front surface of the case; and
   a power transmission member, including:
      a protrusion protruding from a rear surface of the manipulation member at a position a predetermined distance away from a rotation shaft of the manipulation member, the protrusion configured to be parallel to the rotation shaft of the manipulation member; and a slot formed in the other end of the latch member to receive the protrusion, and formed in a curved shape to guide the movement of the protrusion when the manipulation member rotates.

2. The refrigerator according to claim 1, wherein the latch receiving member is a hook part.

3. The refrigerator according to claim 2, wherein the hook part protrudes from the front surface of the case, and
   an insertion hole in which the hook part is inserted is defined in the front part.

4. The refrigerator according to claim 2, wherein an end of the latch member comprises:
   a guide section having a thickness gradually increasing from a hook part-side end thereof toward the manipulation member; and
   a maintenance section having a flat surface on an end of the guide section toward the manipulation member.

5. The refrigerator according to claim 2, wherein an outer end of the latch member contacting the hook part has an inclination gradually increasing inward.

6. The refrigerator according to claim 2, wherein a rolling contact member rolling-contacting the latch member is disposed on the hook part.

7. The refrigerator according to claim 2, wherein the latch member comprises:
   a body formed of a metal material, the body being connected to the manipulation member; and
   a fixed part formed of a synthetic resin material, the fixed part being disposed on an end of the body and insertable into the hook part.

8. The refrigerator according to claim 2, wherein the drawer comprises the front part defining a front surface thereof and a space part covered by the front part,
   the manipulation member is exposed through the front part, and
   the latch member is disposed inside the space part.

9. The refrigerator according to claim 8, wherein the latch member is inserted into the hook part in a state where the hook part is inserted into the space part.

10. The refrigerator according to claim 1, wherein the manipulation member is rotatably disposed on the drawer.

11. The refrigerator according to claim 1, wherein
    when the manipulation rotates to seal the case by attaching the rear surface of the front part to the front surface of the case, the protrusion moves from one end of the slot to the other end of the slot,
    and wherein a distance from the rotation shaft of the manipulation member to the other end of the slot is shorter than a distance from the rotation shaft of the manipulation member to the one end of the slot.

12. The refrigerator according to claim 11, wherein the sealing apparatus is disposed on two opposing sides of the drawer, and
    the manipulation member includes two protrusions, wherein the protrusions are disposed to face each other with respect to the rotation shaft of the manipulation member.

13. The refrigerator according to claim 1, wherein the latch member moves in a direction that crosses a withdrawal direction of the drawer.

14. The refrigerator according to claim 1, further comprising a guide guiding a movement of the latch member is further disposed on the drawer.

15. The refrigerator according to claim 1, further comprising a rotation pressing unit to rotatably press the manipulation member toward a sealing or releasing position when the manipulation member rotates.

16. The refrigerator according to claim 1, further comprising a pump connected by a connection tube disposed on the case, and air within the case is forcibly exhausted by an operation of the pump.

17. The refrigerator according to claim 1, further comprising a communication part defined in the drawer, wherein the communication part is selectively opened or closed by the latch member to selectively exhaust air within the case when the manipulation member is manipulated.

* * * * *